United States Patent [19]

Suzuki et al.

[11] 3,955,070

[45] May 4, 1976

[54] APPARATUS FOR MEASURING VARIABLE QUANTITIES

[75] Inventors: Keisuke Suzuki; Toru Fukumura, both of Hiratsuka; Okinori Moriya, Yokohama, all of Japan

[73] Assignee: Kabushiki Kaisha Komatsu Seisakusho, Japan

[22] Filed: May 1, 1974

[21] Appl. No.: 465,983

[30] Foreign Application Priority Data

May 7, 1973  Japan.......................... 48-53399[U]

[52] U.S. Cl. ................... 235/92 MT; 235/92 CA; 235/92 NT; 235/150.51
[51] Int. Cl.² .................. G04F 10/00; G01L 23/00
[58] Field of Search .......... 235/183, 150.51, 92 BD, 235/92 CA, 92 CP, 92 MT, 92 NT, 92 PD, 92 QC

[56] References Cited
UNITED STATES PATENTS

| | | | |
|---|---|---|---|
| 3,480,911 | 11/1969 | Danna........................ | 235/92 MT |
| 3,627,995 | 12/1971 | Warner et al.................. | 235/92 BC |
| 3,665,165 | 5/1972 | Strandberg et al. ............ | 235/92 PD |
| 3,733,424 | 5/1973 | Pitts et al...................... | 235/92 MT |
| 3,766,535 | 10/1973 | Deebel et al.................. | 235/92 MT |
| 3,769,844 | 11/1973 | Skoures......................... | 235/92 CA |
| 3,793,512 | 2/1974 | Lorenzen ..................... | 235/92 QC |

*Primary Examiner*—Felix D. Gruber
*Attorney, Agent, or Firm*—Ladas, Parry, Von Gehr, Goldsmith & Deschamps

[57] ABSTRACT

In an apparatus for measuring variable quantities such as fluid pressure, stress and strain there are provided an electric pulse generator for generating an electric pulse during a measuring interval in which the quantity to be measured exceeds a preset value, a counter for counting the number of pulses and a time measuring apparatus for cumulatively adding the measuring intervals. By providing a plurality of sets of the elements described above responsive to different set values, the variation of the quantity over a long period of time can be precisely supervised.

7 Claims, 6 Drawing Figures

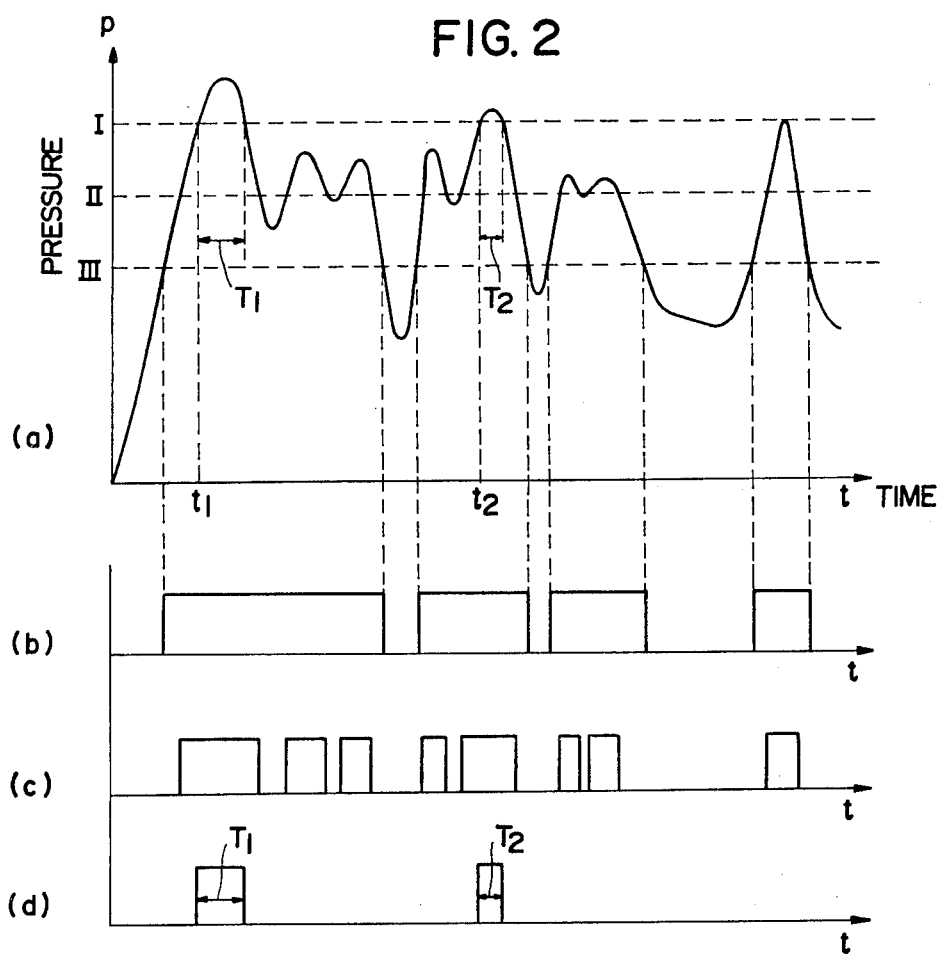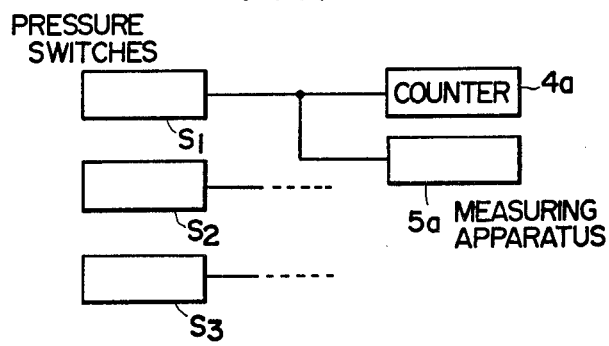

APPARATUS FOR MEASURING VARIABLE QUANTITIES

BACKGROUND OF THE INVENTION

This invention relates to an apparatus for measuring variable quantities such as fluid pressure, stress and strain and, more particularly, to an apparatus for measuring or supervising the variation in the variable quantity over a long period of time.

The pressure of fluid, for example oil, has been measured statically by means of a Bourdon-tube gauge but the device can not measure a rapid pressure variation such as a surge pressure or the like. Accordingly, for measuring the surge pressure or the like a method has been proposed wherein a pressure-electric converter is used to convert pressure into an electric signal and the electric signal is recorded on a magnetic tape recorder. However, in an ordinary oil pressure operated machine or apparatus there are so much data to be measured that it is difficult as well as expensive to measure and process such large amount of data with the apparatus utilizing pressure-electro converters. Such problems also exist where it is necessary to measure or supervise other variable quantities such as stress and strain over a long period.

SUMMARY OF THE INVENTION

Accordingly, it is an object of this invention to provide a novel apparatus for measuring the variation in variable quantities.

Another object of this invention is to provide a novel apparatus capable of measuring not only the number of times at which the value of the quantity exceeds a preset value but also the sum of the intervals in which the value of the quantity exceeds a preset value.

A further object of this invention is to provide an improved apparatus capable of measuring not only the number of times at which the quantity exceeds each one of a plurality of preset values but also the sums of the measuring intervals in which the quantity exceeds the respective preset values.

According to this invention, there is provided an apparatus for measuring the variation in variable quantity comprising means for generating an electric pulse during each interval in which the quantity exceeds a preset value, a counter for counting the number of the pulses, and a time measuring apparatus for cumulatively adding the intervals.

According to a modified embodiment of this invention a number of identical sets each comprising the pulse generating means, the counter and the time measuring apparatus described above are provided for different set values of the variable quantity.

BRIEF DESCRIPTION OF THE DRAWINGS

The invention can be more fully understood from the following detailed description taken in conjunction with the accompanying drawings in which:

FIG. 2 is a graph showing the waveforms of pressure and currents at various portions of the circuit shown in FIG. 1;

FIG. 5 is a block diagram illustrating a modified embodiment of this invention.

DESCRIPTION OF THE PREFERRED EMBODIMENTS

Figure 1:
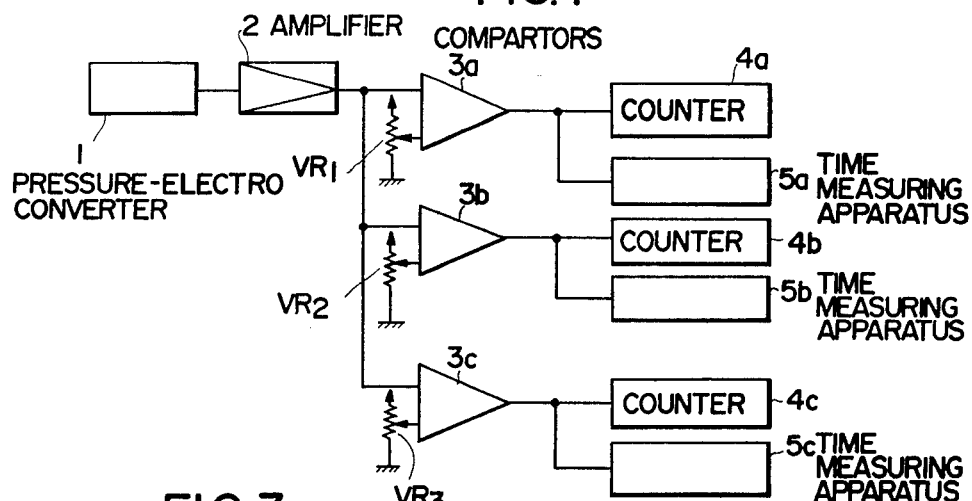
FIG. 1 is a block diagram showing one example of the oil pressure measuring apparatus embodying the invention.

Referring now to FIG. 1 of the accompanying drawing, the oil pressure measuring apparatus shown therein comprises a pressure-electro converter 1 for converting pressure into an electric signal, for example a voltage signal, an amplifier 2 for amplifying the voltage signal, and comparators 3a, 3b and 3c which are connected in parallel to receive the output from the amplifier 2 at their one inputs, the other inputs of the comparators 3a, 3b and 3c being connected to the sliding arms of potentiometers $VR_1$, $VR_2$ and $VR_3$, respectively, to receive different reference voltages corresponding to different pressure valves. The outputs of the comparators are applied to counters 4a, 4b and 4c, respectively, which are connected in parallel with time measuring apparatus 5a, 5b and 5c respectively.

When the output from amplifier 2 exceeds the reference voltage supplied by potentiometer $VR_1$ and corresponds to a predetermined oil pressure at an instant $t_1$, the comparator 3a produces an output. In response to this output, the contents of counter 4a are increased by one and at the same time the time measuring apparatus 5a is started. Assuming that the reference voltage supplied by potentiometer $VR_1$ is expressed by I in FIG. 2, the comparator 3a produces an output as shown in FIG. 2(d), and the interval $T_1$ in which the oil pressure is higher than the predetermined value is measured by the time measuring apparatus 5a. As the oil pressure again exceeds the predetermined pressure I at instant $t_2$, the same operation is repeated with the result that the count of counter 4a is again increased by one and the time measuring apparatus 5a operates to add interval $T_2$ to the interval $T_1$.

Although it is possible to measure surge pressure by a measuring system including comparator 3a, counter 4a and time measuring apparatus 5a it is possible to measure the surge pressure more precisely when a number of such measuring systems responding to different pressures are provided.

In the embodiment shown in FIG. 1, three such measuring systems are provided. More particularly, the reference voltages established by potentiometers $VR_2$ and $VR_3$ correspond to pressures II and III shown in FIG. 2a. Then, comparator 3b produces an output pulse as shown in FIG. 2c. Accordingly, counter 4b counts the number of times (in this example, 8) at which the pressure exceeds the set value II, and the sum of the intervals in which the pressure exceeds the set value II is measured by time measuring apparatus 5b. In the same manner, counter 4c counts the number of times (in this example 4) at which the pressure exceeds the set value III, and the sum of the intervals is measured by time measuring apparatus 5c. In this manner, respective counters 4a, 4b and 4c and respective time measuring apparatus 5a, 5b and 5c operate to count the number of times at which the oil pressure exceeds respective set values and to measure the sum of the intervals during which the oil pressure exceeds respective set values when the oil pressure varies over a long period as shown in FIG. 2a.

Figure 3:
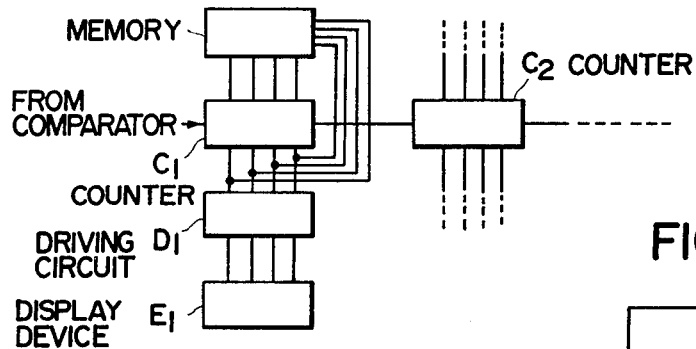
FIG. 3 is a block diagram showing one example of a counter utilized in this invention.

One example of the counter is shown in FIG. 3 which comprises a decimal counter $C_1$ which counts the number of pulses from the comparator, a display device $E_1$ of a suitable type such as a discharge tube type, a driving circuit $D_1$ responsive to the contents of the counter $C_1$ for driving the display device $E_1$, a memory device $M_1$ for storing the contents of the counter $C_1$. It should be understood that identical elements are provided for different orders of magnitude as shown by a counter $C_2$ and dotted lines.

Figure 4A:
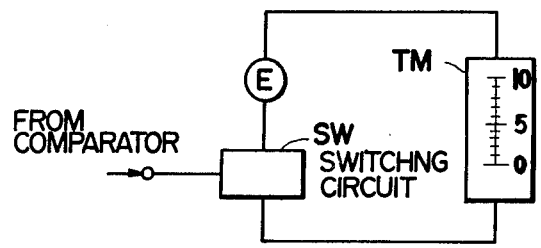
FIGS. 4a and 4b are block diagrams showing different examples of the time measuring apparatus utilized in the circuit shown in FIG. 1
Figure 4B:
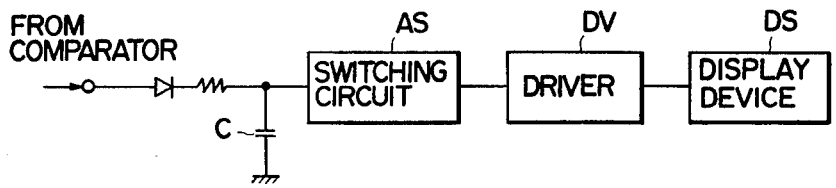

One example of the time measuring circuit shown in FIG. 4a comprises a switching circuit SW operated by the output pulse from the comparator shown in FIG. 1 for applying the voltage of a source E across a timer TM. Thus, each time the comparator produces an output pulse, the timer TM receives voltage from the source E for the duration of the output pulse and is advanced by the duration of the output pulse thus indicating the sum of the respective durations of the pulses. In an alternative arrangement shown in FIG. 4b the duration of the pulses from the comparator is integrated by an integrator shown as a capacitor C. The integrated value, that is the terminal voltage of the capacitor is displayed by a display device DS through a switching circuit AS and a driving circuit DV.

Instead of using a single pressure-electro converter and a plurality of comparators responsive to different set values as shown in FIG. 1, it is also possivle to use a plurality of pressure switches $S_1$, $S_2$ and $S_3$ operating at different pressures as shown in FIG. 5. Of course, the output of each pressure switch is applied to a combination of a counter and a time measuring apparatus in the same manner as in the embodiment shown in FIG. 1.

With the apparatus of this invention, it is possible to supervise the variation, especially the surge, in the pressure of fluid over a long period, for example one to two years or more. It is also possible to supervise the variation in stress or strain by substituting stress or strain meter or a stress or strain-electro converter by the pressure-electro converter or the pressure meter described above. Therefore the invention is suitable for many applications where it is necessary to supervise the variation in the pressure of fluid or variation in the stress or strain of a structure over a long period of time.

For example, the apparatus may be used for supervising variation of hydraulic pressure in the head or bottom of a boom cylinder or in a hydraulic pump incorporated in construction machinery such, for example, as a bulldozer. Thus, the apparatus may serve to improve reliability of hydraulic apparatus used in the construction machinery if it is used to measure variation of hydraulic pressure etc. in the construction machinery which is actually in use and the hydraulic apparatus is designed on the basis of data thus obtained by the employment of the apparatus according to this invention.

What is claimed is:

1. Apparatus for monitoring surges in a variable quantity such as fluid pressure, stress or strain, comprising a plurality of pulse generator means each responding to said quantity exceeding a preset value therefor by generating an electric pulse having a predetermined level during the interval in which said quantity exceeds said preset value, the preset values to which the different pulse generator means respond being different from one another, a plurality of counters each counting the number of said pulses generated by a corresponding pulse generator means, and a plurality of time measuring apparatus each cumulatively adding the durations of said pulses generated by a corresponding pulse generator means.

2. Apparatus as claimed in claim 1, wherein each said pulse generator means comprises a pressure-electro converter, an amplifier for amplifying the output of said pressure-electro converter, and a comparator which compares the output of said amplifier with a reference voltage representing said preset value to which that pulse generator means responds for generating an output when the output voltage of said amplifier is higher than said reference voltage.

3. Apparatus as claimed in claim 1, wherein each time measuring apparatus comprises a timer, a current source, and a switching circuit which defines a controlled current path between the current source and the timer and is connected to the pulse generator means in such manner that said controlled current path is closed only when a pulse from said corresponding pulse generator means is applied to the time measuring apparatus, the timer measuring the duration for which it receives current from said current source.

4. An apparatus as claimed in claim 1, wherein each said pulse generator means comprises a pressure switch responsive to said preset value to which that pulse generator means responds for generating an electrical output.

5. Apparatus as claimed in claim 1, wherein each said time measuring apparatus comprises an integrator for successively integrating pulses produced by said corresponding generator means, and display means for displaying an indication of the time represented by the integrated value of the pulses.

6. Apparatus as claimed in claim 1, wherein each said counter comprises a plurality of decimal counting devices and a plurality of memory devices associated respectively with the counting devices for storing the contents of the respective counting devices, the number of counting devices being equal to the number of orders of magnitude to be counted.

7. A method of monitoring surges in a variable quantity such as fluid pressure, stress or strain, comprising the steps of responding to the quantity exceeding each of a plurality of different preset values by generating respective electric pulses each having a predetermined level during the intervals for which the quantity exceeds the preset values respectively, and employing the pulses to count the number of times each of said preset values is exceeded and to add cumulatively the durations for which each of said preset values is exceeded.

* * * * *